United States Patent
Aich et al.

(10) Patent No.: US 10,005,352 B2
(45) Date of Patent: Jun. 26, 2018

(54) ELECTRICAL BICYCLE MODULAR POWERTRAIN

(71) Applicant: Ford Global Technologies, LLC, Dearborn, MI (US)

(72) Inventors: Sudipto Aich, Palo Alto, CA (US); David Melcher, Ypsilanti, MI (US); Zachary David Nelson, Detroit, MI (US); Christopher Peplin, Ann Arbor, MI (US); Jamel Seagraves, Mountain View, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 89 days.

(21) Appl. No.: 14/486,164

(22) Filed: Sep. 15, 2014

(65) Prior Publication Data
US 2016/0075225 A1    Mar. 17, 2016

(51) Int. Cl.
*B60K 1/00* (2006.01)
*B60K 7/00* (2006.01)
(Continued)

(52) U.S. Cl.
CPC .......... *B60K 7/0007* (2013.01); *B60B 27/023* (2013.01); *B60B 27/04* (2013.01); *B60K 1/04* (2013.01); *B62M 6/65* (2013.01); *B62M 6/90* (2013.01); *B60B 19/02* (2013.01); *B60B 27/065* (2013.01); *B60B 2900/351* (2013.01);
(Continued)

(58) Field of Classification Search
CPC ................. B60K 7/0007; B60K 7/00; B60K 2007/0092; B60K 2007/0038; B60K 1/00; B60K 1/04; B62M 6/90; B62M 6/00; B62M 6/65; B62M 6/40; B62M 6/45; B62M 6/80; B60B 27/06; B60B 27/065
See application file for complete search history.

(56) References Cited

U.S. PATENT DOCUMENTS 2,353,730 A * 7/1944 Joy ......................... B60K 17/14
                                                            180/23
4,007,968 A * 2/1977 Solis ....................... B60B 11/02
                                                          301/38.1
(Continued)

FOREIGN PATENT DOCUMENTS

CN    2825435 Y    10/2006
CN   201118337 Y    9/2008
(Continued)

OTHER PUBLICATIONS

GB Search Report dated Mar. 11, 2016 (4 pages).
Zehus, Wize Hub#WIZE#WIZE, © 2014 Zehus s.r.l. VAT: IT08250860965 (5 pages).

*Primary Examiner* — James M Dolak
(74) *Attorney, Agent, or Firm* — Jennifer Stec; Bejin Bieneman PLC (57) ABSTRACT

A drive unit for a vehicle includes a drive unit spindle. The drive unit spindle extends along an axis for connecting the drive unit to the vehicle. The drive unit further includes one or more wheel assemblies. Each of the wheel assemblies has a hub that is removably supported by the spindle along the axis. At least one of the wheel assemblies includes a wheel which rotates about the hub and a motor connected to the wheel to rotate the wheel about the hub.

13 Claims, 7 Drawing Sheets

(51) Int. Cl.
- *B62M 6/65* (2010.01)
- *B62M 6/90* (2010.01)
- *B60K 1/04* (2006.01)
- *B60B 27/02* (2006.01)
- *B60B 27/04* (2006.01)
- *B60B 27/06* (2006.01)
- *B60B 19/02* (2006.01)

(52) U.S. Cl.
CPC .......... *B60K 2001/045* (2013.01); *B60K 2007/0092* (2013.01); *B60Y 2200/11* (2013.01); *B60Y 2200/13* (2013.01); *B60Y 2304/078* (2013.01)

(56) References Cited

U.S. PATENT DOCUMENTS

| | | | | |
|---|---|---|---|---|
| 4,427,086 A * | 1/1984 | de Coiselet (de F.) | .. | B60V 3/02 180/119 |
| 4,437,530 A * | 3/1984 | De Young | ............... | B60B 11/06 180/372 |
| 4,799,564 A * | 1/1989 | Iijima | ................. | B60K 7/0007 180/65.51 |
| 5,624,004 A * | 4/1997 | Watanabe | ................ | B60K 1/02 180/168 |
| 6,298,932 B1 * | 10/2001 | Bowman | ................ | B60B 11/00 180/6.5 |
| 6,328,123 B1 * | 12/2001 | Niemann | ............. | B60K 7/0007 180/65.51 |
| 6,537,167 B1 * | 3/2003 | Gazyakan | ............ | B60K 7/0007 180/372 |
| 6,588,538 B2 * | 7/2003 | Hinton | .................... | B60B 11/06 180/363 |
| 6,672,985 B2 * | 1/2004 | Chung | ................ | B60K 17/16 180/24.03 |
| 6,733,088 B2 * | 5/2004 | Elkow | .................... | B60O 5/22 152/415 |
| 6,890,039 B2 * | 5/2005 | Chung | ................... | B60B 11/00 301/36.2 |
| 6,979,013 B2 | 12/2005 | Chen | | |
| 7,147,073 B2 * | 12/2006 | Mollhagen | ........... | B60K 17/046 180/65.51 |
| 7,658,251 B2 * | 2/2010 | James | ................ | B60K 7/0007 180/65.51 |
| 7,757,795 B2 * | 7/2010 | Chien | .................... | B60B 11/02 180/24.03 |
| 7,828,101 B2 | 11/2010 | Radtke et al. | | |
| 8,419,580 B2 | 4/2013 | Lo | | |
| 8,459,386 B2 * | 6/2013 | Pickholz | ............... | B60K 7/0007 180/65.31 |
| 8,600,620 B2 * | 12/2013 | Noel | ........................ | B62D 3/02 180/400 |
| 8,602,145 B2 * | 12/2013 | Su | ........................ | B60K 7/0007 180/65.51 |
| 8,690,265 B2 * | 4/2014 | Noblanc | ................. | B60B 11/02 301/36.1 |
| 8,795,130 B2 * | 8/2014 | Forrest | .................... | F16D 11/14 192/69.43 |
| 8,807,254 B2 * | 8/2014 | Manus | ................. | B60K 7/0007 180/65.51 |
| 9,061,576 B2 * | 6/2015 | Kim | ................. | B62M 7/12 |
| 9,211,932 B1 * | 12/2015 | Huennekens | .......... | B62K 13/06 |
| 9,283,836 B2 * | 3/2016 | Oriet | ........................ | B60K 1/00 |
| 9,308,811 B2 * | 4/2016 | Boeer | .................. | B60K 7/0007 |
| 9,327,563 B2 * | 5/2016 | Noblanc | ................. | B60C 29/02 |
| 9,346,330 B2 * | 5/2016 | Musgrave | ............... | B60S 5/043 |
| 9,511,635 B2 * | 12/2016 | Berkness | .............. | B60C 23/003 |
| 9,550,542 B2 * | 1/2017 | Figueroa | ................ | B62K 15/00 |
| 9,573,648 B2 * | 2/2017 | Thompson | .......... | B62K 15/006 |
| 9,604,532 B2 * | 3/2017 | Hoffmann | ............... | B60K 11/02 |
| 9,616,706 B2 * | 4/2017 | Benoit, Jr. | .............. | B60B 11/02 |
| 9,688,099 B2 * | 6/2017 | Niemczyk | ............... | B60B 11/02 |
| 9,694,712 B2 * | 7/2017 | Healy | ................. | B60L 15/2045 |
| 9,783,040 B2 * | 10/2017 | Wolf-Monheim | ... | B60K 11/02 |
| 9,815,520 B2 * | 11/2017 | Figueroa | ................ | B62M 6/55 |
| 2006/0207814 A1 * | 9/2006 | Tseng | ................ | B60K 7/0007 180/65.51 |
| 2007/0278845 A1 * | 12/2007 | Vandendriessche | .... | B60B 3/145 301/35.628 |
| 2010/0089671 A1 | 4/2010 | Trunkenpolz | | |
| 2010/0194180 A1 * | 8/2010 | Gibson | .................... | B60B 11/04 301/36.1 |
| 2011/0168465 A1 * | 7/2011 | Starr | .................... | B60K 7/0007 180/65.51 |
| 2011/0168466 A1 * | 7/2011 | Starr | .................... | B60K 7/0007 180/65.51 |
| 2012/0132473 A1 * | 5/2012 | Weber | ................. | B60K 7/0007 180/58 |

FOREIGN PATENT DOCUMENTS

| | | |
|---|---|---|
| CN | 201872541 U | 6/2011 |
| CN | 203638016 U | 6/2014 |
| EP | 2176117 B1 | 3/2011 |
| JP | 2005119349 A | 5/2005 |
| WO | 2010091524 A1 | 8/2010 |

\* cited by examiner

ELECTRICAL BICYCLE MODULAR POWERTRAIN

BACKGROUND

The powertrain continues to be a major contributor to the expense of today's electrified vehicles. The batteries and motors associated with electrified powertrains increase costs significantly compared to conventional internal combustion powertrains. Also, electrified powertrains typically have many trade-offs when it comes to efficiency. Optimizing an electrified vehicle for increased efficiency at highway speeds results in lower efficiency for low speed driving. Vehicles optimized for low speeds do not perform well on the highway. As such, there remains a need for electrified powertrains that can be adapted to their operating conditions.

Further, a multi-modal transportation systems may include a vehicle used for a first portion of a journey and an electrically assisted bicycle for a second portion of the journey. For example, a user may transport the electrically assisted bicycle in the vehicle such that, after the first portion of the journey is completed in the vehicle, the electrically assisted bicycle may be removed from the vehicle and used for the second portion of the journey. However, transport of the electrically assisted bicycle in the vehicle may cause packaging constraints within the vehicle, in particular with relatively small vehicles. As such, there remains an opportunity for decreasing packaging constraints associated with multi-modal transportation systems.

DETAILED DESCRIPTION

With reference to the Figures, wherein like numerals indicate like parts throughout the several views, a multi-modal transportation system 10 is generally shown. The multimodal transportation system 10 includes a drive unit 20 for connecting to a vehicle 11, a bicycle 100, and a plurality of wheel assemblies 50. The drive unit 20 has a drive unit spindle 30 extending along an axis A1 and the bicycle 100 has a bicycle spindle 110. The plurality of wheel assemblies 50 each includes a hub 70, the hubs 70 being removably supported by the drive unit spindle 30 along the axis A1. One wheel assembly 500 of the plurality of wheel assemblies 50 includes a wheel 52 rotatable about the hub 70 and a motor 64 for driving the wheel 52 about the hub 70. The hub 70 of the one wheel assembly 50 defines an opening 78 shaped to mount on the drive unit spindle 30 and alternatively to mount on the bicycle spindle 110.

The multimodal system 10 allows for the sharing of the one wheel assembly 500 between the vehicle 11 and bicycle 100. This has the advantage of reducing the cost of the multimodal system 10, because it is not necessary to have a dedicated wheel assembly 500 for the bicycle 100. Instead, the one wheel assembly 500 can be used on the vehicle 11 while the vehicle 11 is transporting the bicycle 100. When a destination is reached, the one wheel assembly 500 can be removed from the vehicle 11 and mounted on the bicycle 100. This has the additional advantage that the bicycle 100 will take up less space in the vehicle 11 during transportation, because the one wheel assembly 500 will be mounted on the vehicle 11 during this phase of a journey.

Figure 1:
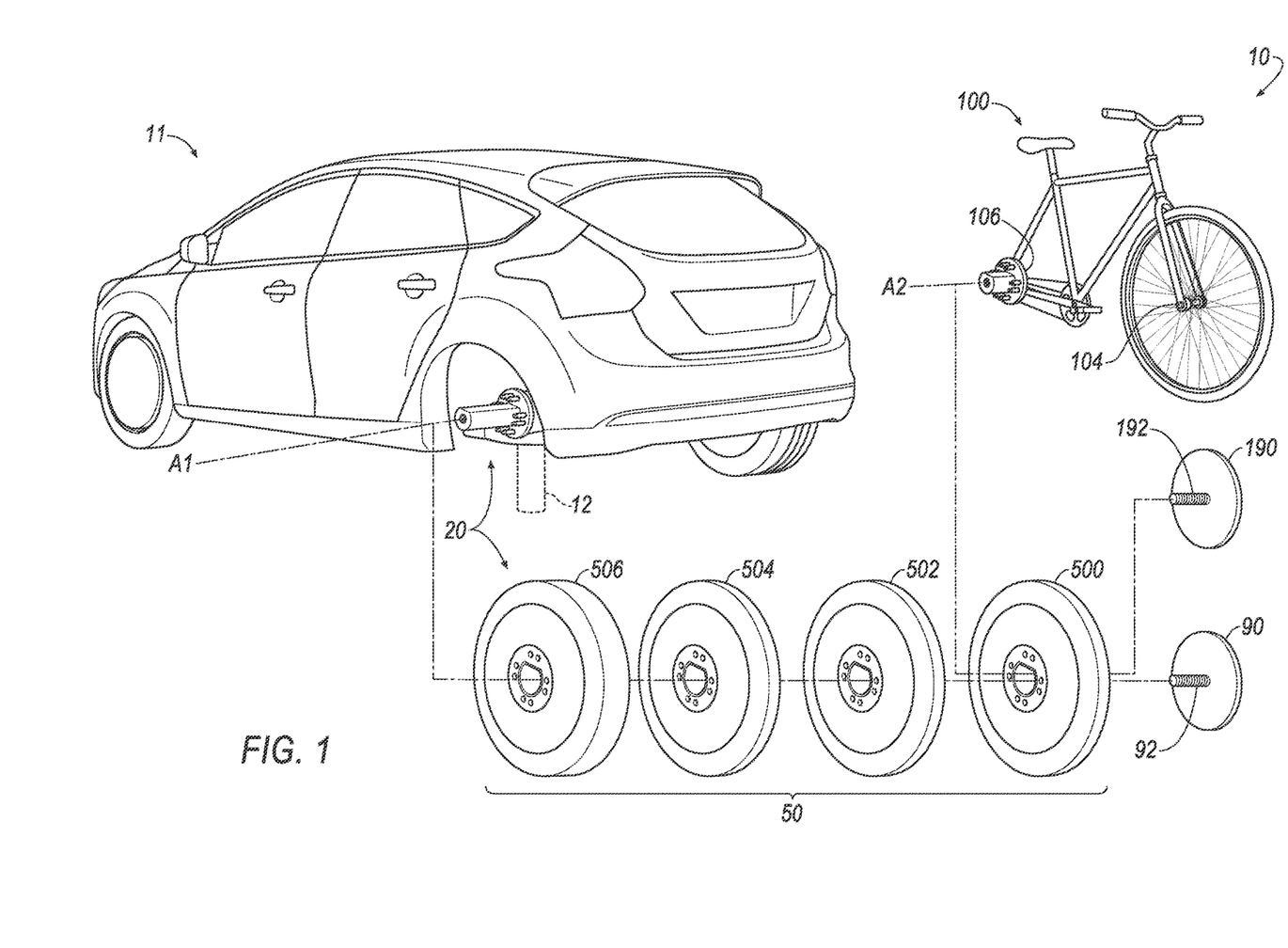
FIG. 1 is a perspective view of a multimodal transportation system including a vehicle and a bicycle including a wheel assembly that is shaped to alternatively mount to the vehicle and to the bicycle.
Figure 5:
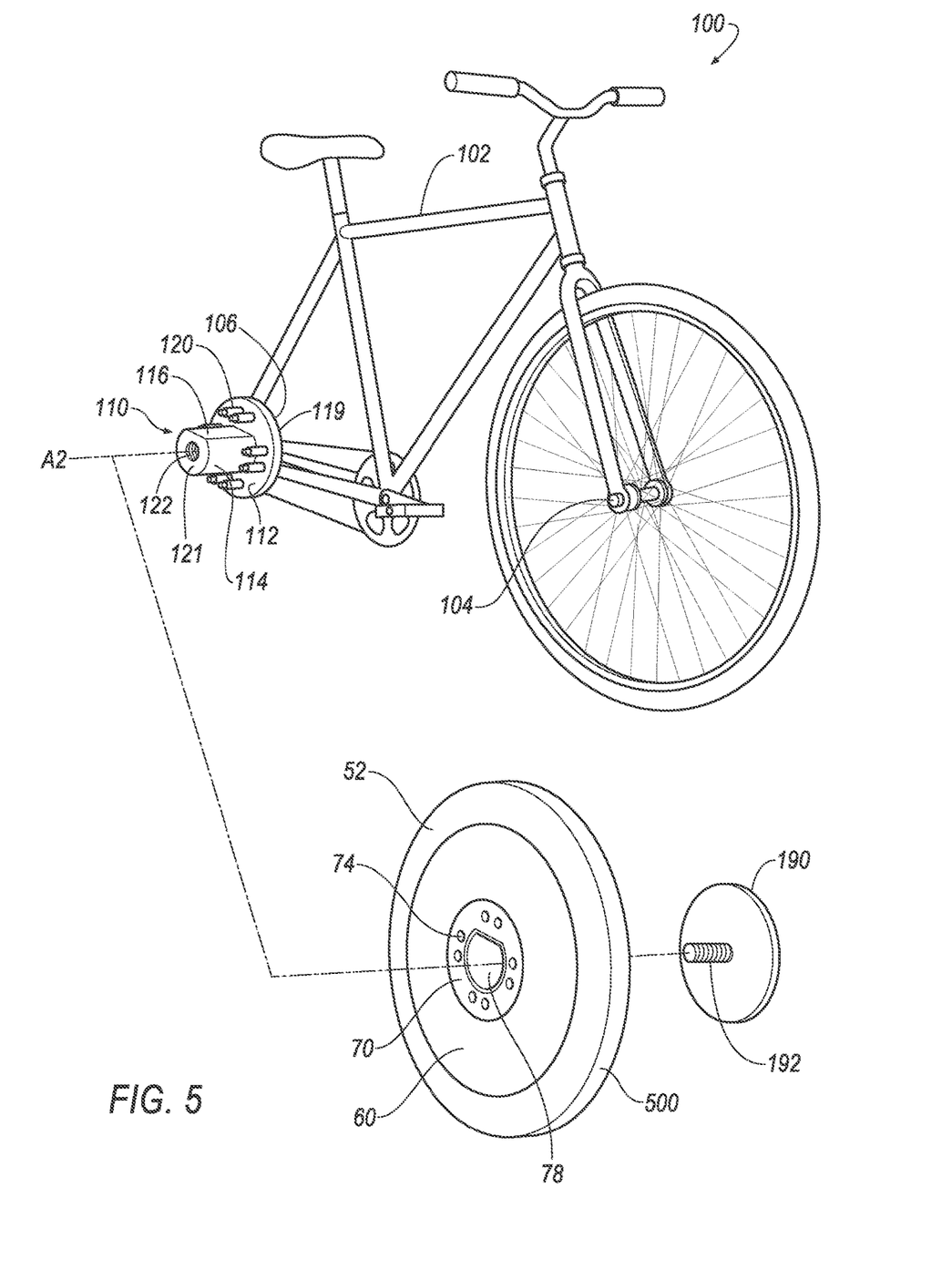
FIG. 5 is a perspective view of a bicycle including a bicycle spindle for connecting to the wheel assembly.

Referring to FIG. 1, the plurality of wheel assemblies 50 of the multimodal transportation system 10 may be mounted on the drive unit 20 of the vehicle 11 while the vehicle 11 is transporting the bicycle 100. As shown in FIGS. 1 and 5, upon reaching a destination, the one wheel assembly 500 may be removed from the drive unit 20, and mounted on the bicycle spindle 110. This permits sharing of the wheel assembly 500 between the vehicle 11 and the bicycle 100.

The vehicle 11 may be of many types, such as, for example, any type of automobile. Further, the vehicle 11 is not limited to being an automobile, but may be any other type of vehicle. For example, the vehicle 11 may be a golf cart.

The bicycle 100 may be of any suitable type. In the alternative to the bicycle 100, the multimodal transportation system 10 may include a tricycle, a scooter, a moped, a unicycle, an all-terrain vehicle, etc. In such a configuration, the tricycle, the scooter, the moped, the unicycle, the all-terrain vehicle, etc., may include the bicycle spindle 110 for receiving the wheel assembly 500.

Figure 2:
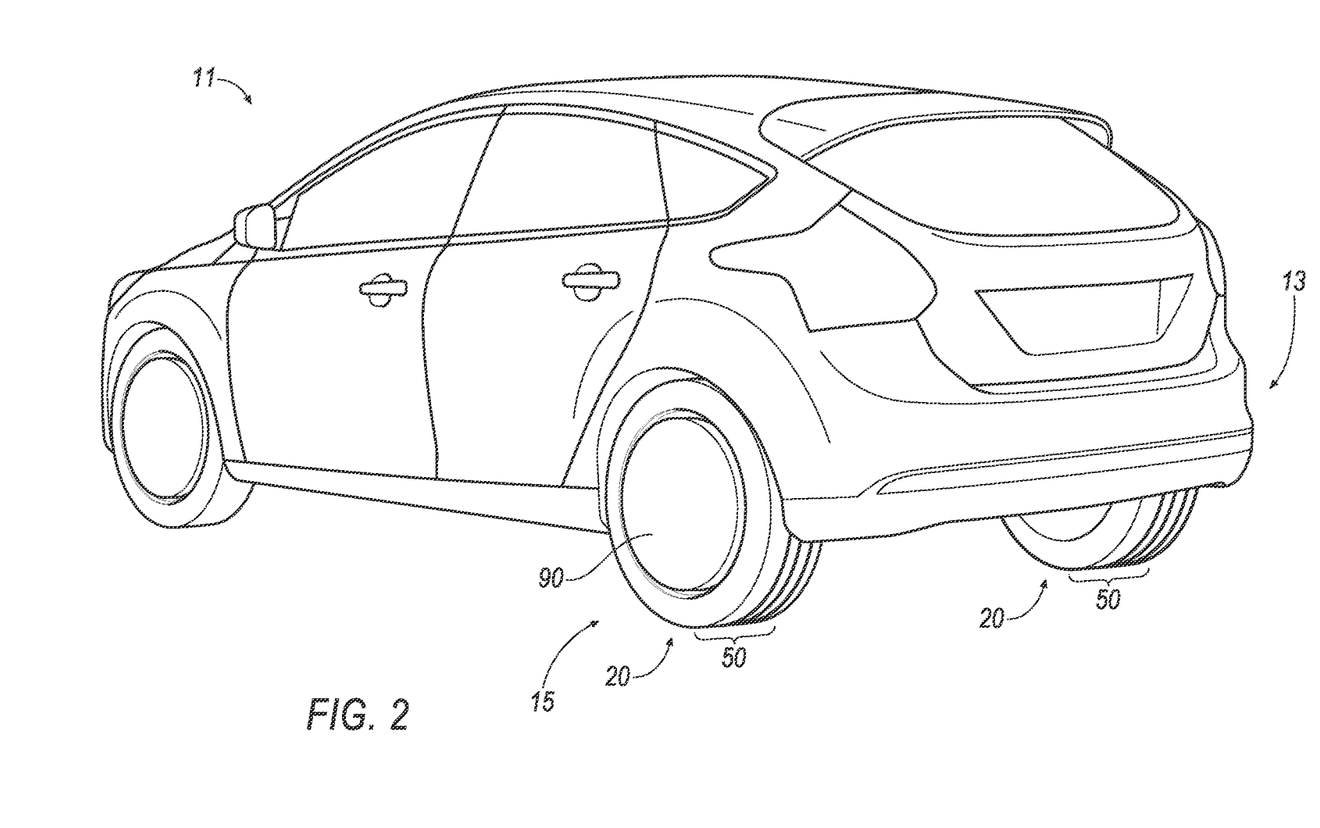
FIG. 2 is perspective view of the vehicle including a drive unit having multiple wheel assemblies.

The number and location of drive units 20 attached to the vehicle 11 is also not limiting. For example, as shown in FIGS. 1 and 2, the vehicle 11 may have two drive units 20, one in each of the right rear corner 13 and left rear corner 15. The drive units 20 could be located, however, in the front left corner 17 and front right corner (not shown) of the vehicle. Only one drive unit 20 could be used on the vehicle 11. As another example, four drive units 20 could be used at the four corners of the vehicle 11. In other words, one or more wheels of the vehicle 11 may be replaced with drive units 20.

The bicycle 100 may include any suitable number of bicycle spindles 110. For example, the bicycle 100 may have the bicycle spindle 110 at a front wheel support location 104. As another example, the bicycle 100 may have bicycle spindles 110 located at both the front wheel support location 104 and a rear wheel support location 106.

Still referring to FIG. 1, the vehicle 11 may include a jack 12. The jack 12 elevates all or a portion of the vehicle 11, to allow removing and attaching wheel assemblies 50 to the drive unit 50. Either an integrated or external jack 12 may be used. The jack may be automatically actuated, e.g., with the use of a motor (not shown), or may be manually actuated, e.g., with the use of a lever (not shown) manually operated by the driver.

Figure 3:
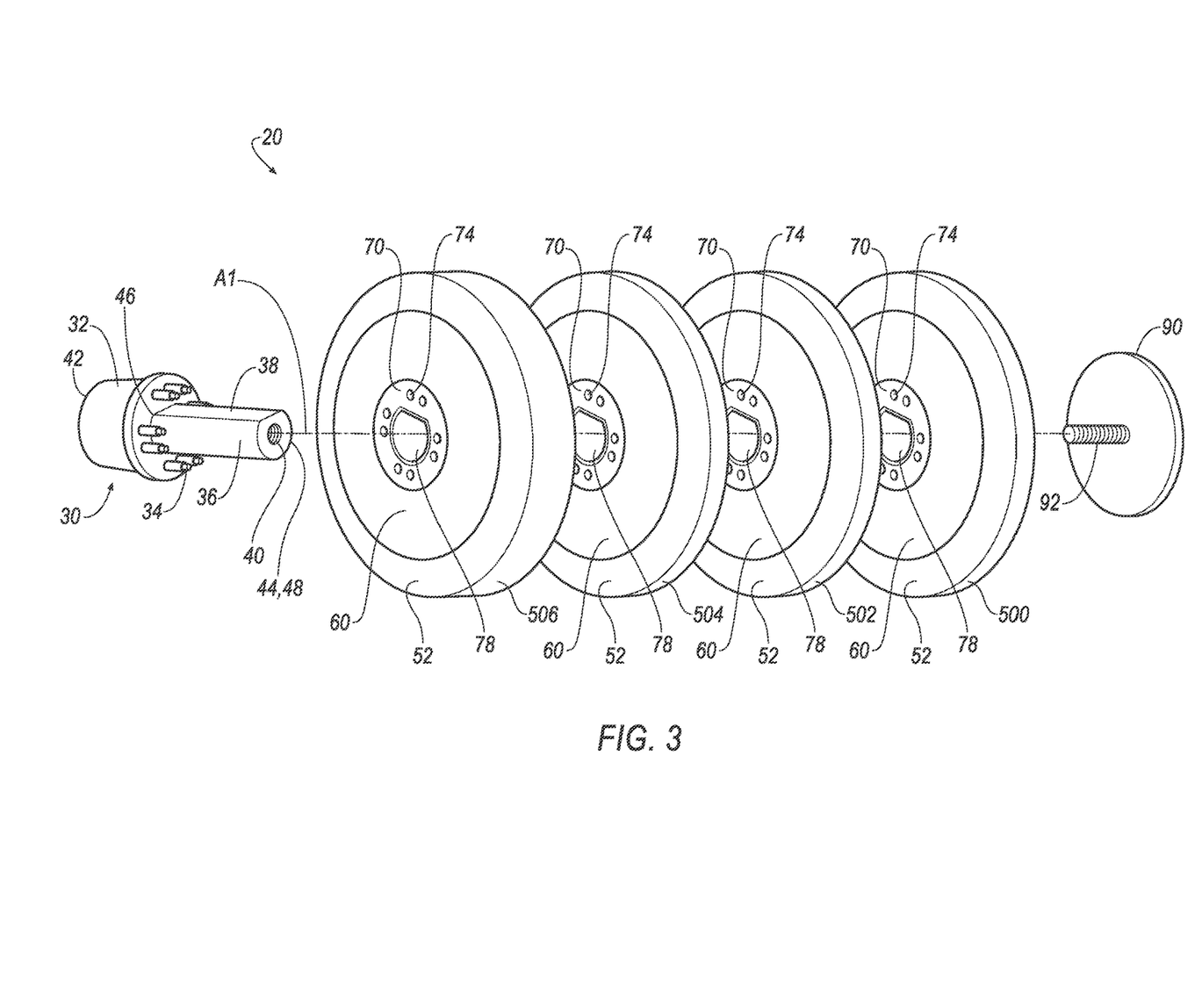
FIG. 3 is an exploded view of the drive unit of the electrified vehicle.

As shown in FIGS. 1-3, the drive unit 20 includes a drive unit spindle 30, a plurality of wheel assemblies 50 removably supported on the drive unit spindle 30 and a lock cap 90 attached to the drive unit spindle 30. The exemplary drive unit 20 shown in FIGS. 1-3 includes four wheel assemblies 50. However, the number of wheel assemblies 50 is not fixed. A drive unit 20 may be designed to include more or fewer wheel assemblies 50 according to the anticipated needs of a particular vehicle 11.

The drive unit spindle 30 has a proximal end 42 and a distal end 44. The drive unit spindle 30 includes a base portion 32 at the proximal end 42 for connecting to the vehicle 11 and an axle portion 36 extending along an axis A1 from the base portion 32. The axle portion 36 has a proximal end 46 connected to the base 32 and a distal end 48. The drive unit spindle 30 connects to the vehicle 11 and supports the plurality of wheel assemblies 50 between the proximal end 42 and the distal end 44. The lock cap 90 connects to the distal end 44 of the drive unit spindle 30.

As shown in FIG. 5, the bicycle has a frame 102. A bicycle spindle 110 is mounted on the frame, and extends along an axis A2, for supporting a wheel assembly 500. The wheel assembly 500 includes a hub 70 forming an opening 78 for mounting the wheel assembly 500 on the bicycle spindle 110. A mounting cap 190 may also be mounted on the bicycle spindle 110.

Provision may be made to align the hubs 70 of the wheel assemblies 50 on the drive unit spindle 30.

The drive unit spindle 30 includes an alignment feature 38. The hub 70 of each wheel assembly 500, 502, 504, 506 defines an opening 78 engaging the alignment feature 38 for aligning the hub 70 on the drive unit spindle 30.

As shown in FIG. 3, the alignment feature 38 is formed on the axle portion 36. The axle portion 36 extends along an axis A1 from the base portion 32 of the drive unit spindle 30. The axle portion 36 is semi-cylindrical in shape, and the alignment feature 38 is formed as a flat surface on a side of the axle portion 36. The proximal end 46 of the axle portion 36 is attached to the base portion 32. The distal end 48 of the axle portion 36 includes an attachment portion 40 for attaching the locking cap 90 to the drive unit spindle 30. The alignment feature 38 aligns the wheel assemblies 500, 502, 504, 506 when they are mounted on the axle portion 36 of the drive unit spindle 30. Other shapes may be used for the axle portion 36 and alignment feature 38 that support and align the wheel assemblies 500, 502, 504, 506.

Along with the first wheel assembly 500, the second wheel assembly 502 of the plurality of wheel assemblies 50 may include a wheel 52 rotatable about the hub 70 and a motor 64 connected to the wheel 52. The motor 64 of the one wheel assembly 500 and motor 64 of the second wheel assembly 502 may be independently operable. As discussed below, each of the one wheel assembly 500 and the second wheel assembly 502 may have a control system 60. The control system 60 of each of the one wheel assembly 500 and second wheel assembly 502 may and control of the motor 64 in each of the respective one wheel assembly 500 and second wheel assembly 502.

The number of wheel assemblies 500, 502, 504, 506 that are motorized is not limited. In addition to the one wheel assembly 500, any one or all of the other wheel assemblies 502, 504 and 506 may include a motor 64 for driving the wheel 52 about the hub 70. The motor 64 of each of the wheel assemblies 500, 502, 504, 506 may be independently operable. In the exemplary drive unit 20 as shown in FIG. 3, each of the wheel assemblies 500, 502, 504, 506 includes a drive system 60 and is motorized.

Figure 4:
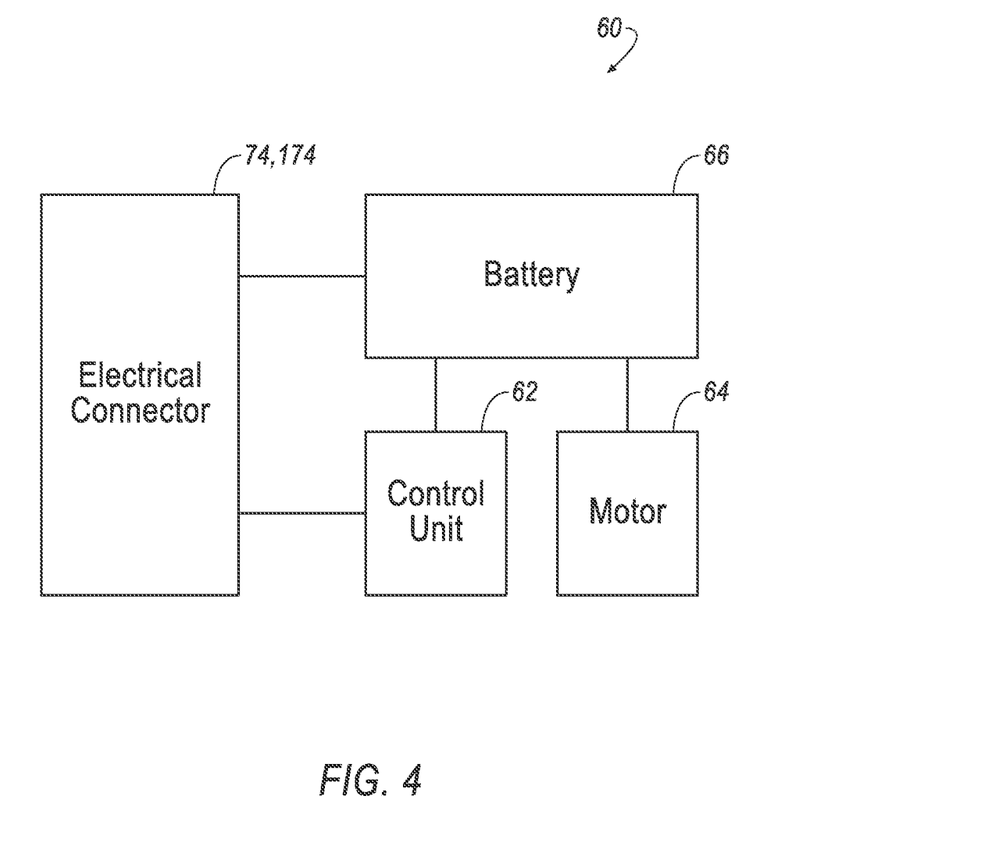
FIG. 4 is a block diagram of a drive system for one of the wheel assemblies.

As shown in FIG. 4, the drive system 60 includes electrical connectors 74, 174 for electrically connecting the wheel assemblies 500, 502, 504, 506 to the drive unit spindle 30 and to each other. The drive system 60 further includes the motor 64 for rotating the wheel 52 around the hub 70, a control unit 62 in communication with the motor 64, and a battery 66 in communication with the motor 64.

The motor 64 may be an electric motor.

The battery 66 may be a lithium battery, in communication with the motor 64.

The one wheel assembly 500 includes a control unit 62 in communication with the motor 64. As shown in FIGS. 3 and 4, the drive system 60 of each wheel assembly 500, 502, 504, 506 includes a control unit 62.

The control unit 62 may be a microcontroller, or a computer, or a digital logic array, or any other form of electronic circuit which can receive input signals and commands, make decisions based on the input signals and commands, and provide output signals to control the motor 64.

The control unit 62 may be programmed to receive commands from the vehicle 11 for operation of the wheel assembly 500, 502, 504, 506 and/or from the bicycle 100 for the operation of the wheel assembly 500. For example, the control unit 62 could receive a command from the vehicle 11 to drive the motor 64 at a particular speed, and provide corresponding outputs to the motor 64 of the wheel assembly 500, 502, 504, 506.

The control unit 62 may use a common communication protocol to receive commands from the vehicle 10 and to receive commands from the bicycle 100. The common communication protocol could be of any suitable type, e.g., a standard protocol, a custom protocol developed specifically for electric drive train applications, or any other suitable protocol. As another example, the control unit 62 may use one suitable type of communication protocol to receive commands from the vehicle 10 and another suitable type of communication protocol to receive commands from the bicycle.

The one wheel assembly 500 includes a battery 66 for supplying power to the motor 64. As shown in FIGS. 3 and 4 and discussed above, each of the wheel assemblies 500, 502, 504, 506 includes a drive system 60 including a battery.

The one wheel assembly 500 may be programmed to receive commands from the vehicle 11 when attached to the drive unit spindle 30 and programmed to operate autonomously when attached to the bicycle spindle 110.

For example, the control unit 62 may be programmed to determine if the one wheel assembly 500 is mounted on the drive unit 20 of a vehicle 11, and further to determine if the one wheel assembly 500 is mounted on a bicycle spindle 110. The control unit 62 could make this determination based on the presence or lack of presence of commands from a vehicle 11. According to the determination, the control unit 62 may switch between a slave mode for taking commands from a vehicle 11, and an autonomous mode, for providing drive assist to the bicycle 100.

As another example, and referring to FIGS. 3 and 5, the control unit 62 could be programmed to detect a difference in configuration of an electrical connector 34 on the drive unit spindle 30, and an electrical connector 120 on the bicycle spindle 110.

The drive unit spindle 30 includes an electrical connector 34 and the hub 70 of each of the plurality of wheel assemblies 50 includes an electrical connector 74, 174 connected to the electrical connector 34 of the drive unit spindle 30.

As shown in FIG. 3, the base portion 32 includes the electrical connector 34. As further shown in FIG. 3, the electrical connector 34 can be in the form of multiple pins extending from the base portion 32 at positions surrounding the axle portion 36.

The electrical connector 34 can also take many other forms. For example, the electrical connector 34 could be a conductive strip with alternating conducting and non-conducting portions, or a plurality of metal plates, or other forms of connectors commonly used in the automotive industry. The electrical connector 34 can be used to communicate data between the vehicle 11 and the wheel assemblies 50. The electrical connector 34 can also be used to provide a power connection between the vehicle 11 and the wheel assemblies 50.

The wheel assemblies 50 are configured to attach to the drive unit spindle 30 via the hub 70. Referring to FIG. 3, the hub 70 defines an opening 78 engaging the alignment feature 38 for aligning the hub 70 on the drive unit spindle 30. In this manner, the hub 70 is supported by the axle portion 36 in a fixed orientation. The hub 70 also includes electrical connectors 74, 174. The electrical connector 74 on the hub 70 is configured to mate with the electrical connector 34 on the drive unit spindle 30 when the wheel assembly 506 is mounted on the drive unit 20.

In a similar manner, as shown in FIG. 5, the bicycle spindle 110 has a base 112 for connecting the bicycle spindle 110 to a bicycle frame 102. The base 112 may have an electrical connector 120, and the electrical connector 120 may be in the form of multiple pins extending from the base portion 112. The bicycle spindle 110 also includes an axle portion 114 with an alignment feature 116.

The wheel assembly 500 mounts on the bicycle spindle 110 in a similar manner as described above with regard to the drive unit spindle 30. The hub 70 defines an opening 78 engaging the alignment feature 116 for aligning the hub 70 on the bicycle spindle 110. In this manner, the hub 70 is supported by the axle portion 114 in a fixed orientation. The electrical connector 74 on the hub 70 is configured to mate with the electrical connector 120 on the bicycle spindle.

In this manner, the wheel assembly 500 previously in use on vehicle 11, can be attached to and provide drive assist for a bicycle 100.

Next, an exemplary connection system for electrically interconnecting the wheel assemblies 500, 502, 504, 506 and the vehicle 11 will be shown.

Referring back to FIG. 3, the drive unit spindle 30 has a proximal end 42 for connecting to the vehicle 11 and a distal end 44 spaced away from the proximal end 42. The proximal end 42 includes the electrical connector 34 and the one wheel assembly 506 includes an electrical connector 74 connected to the electrical connector 34 of the drive unit spindle 30.

Figure 6:
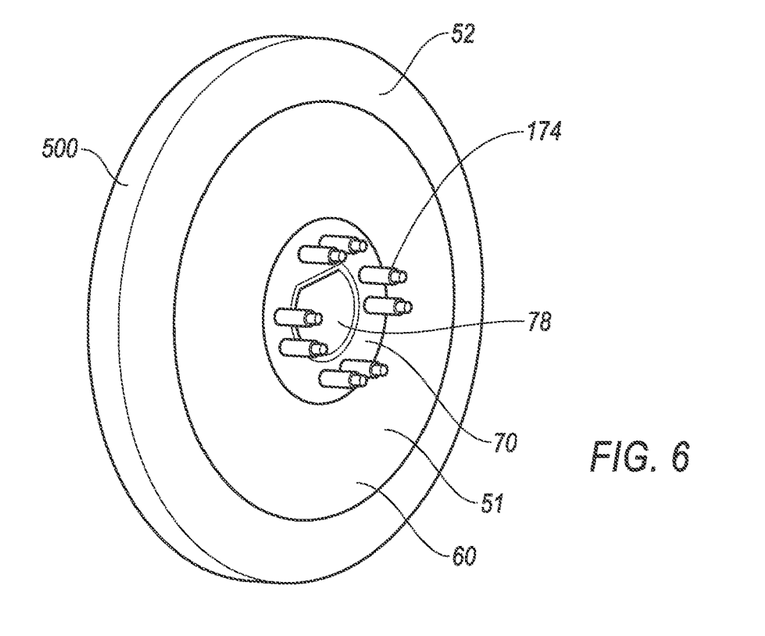
FIG. 6 is a perspective view of a first side of one of the wheel assemblies.
Figure 7:
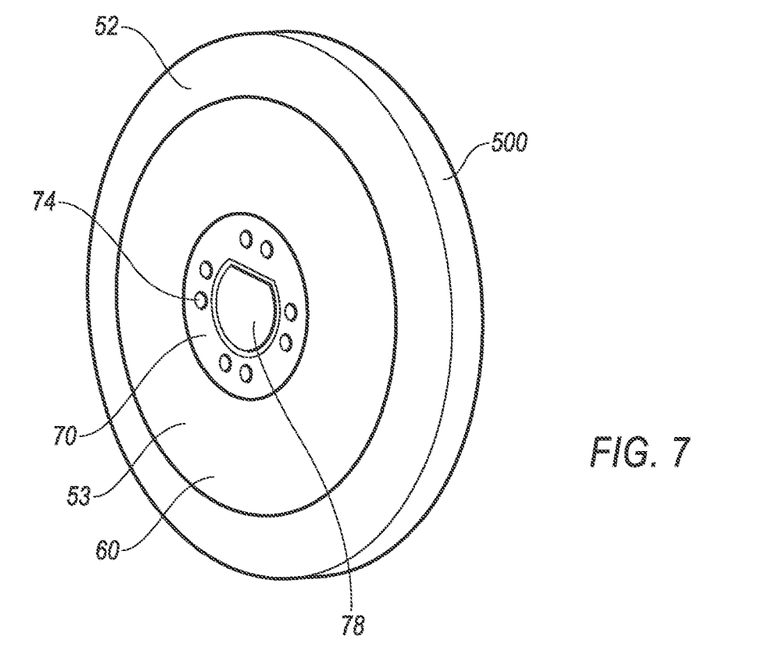
FIG. 7 is a perspective view of a second side of the wheel assembly of FIG. 6.

As further shown in FIGS. 3, 6 and 7, a second wheel assembly 504 of the plurality of wheel assemblies 50 includes a wheel 52 rotatable around the hub 70, a motor 64 connected to the wheel 52 and an electrical connector 74, 174 connected to the electrical connector 74, 174 of the one wheel assembly 506.

The wheel assemblies 500, 502, 504, 506 are configured to support interconnectivity of the wheel assemblies 500, 502, 504, 506 to each other and to the vehicle 11. As shown in FIGS. 6 and 7, the wheel assemblies 500, 502, 504, 506 have a first side 51 and a second side 53. For example, the first side 51 of a wheel assembly 500, 502, 504, 506 may face away from the vehicle 11 when mounted on the drive unit spindle 30. As shown in FIG. 6, the first side 51 of the wheel assemblies 500, 502, 504, 506 includes an electrical connector 174. The electrical connector 174 may be in the form of multiple pins extending from the hub 70.

A second side 53 of the wheel assemblies 500, 502, 504, 506 may face toward the vehicle 11 when mounted on the drive unit spindle 30. As shown in FIG. 7, the second side 53 of the wheel assemblies 500, 502, 504, 506 includes an electrical connector 74. The electrical connector 74 may be in the form of multiple metal plates positioned to connect with the pins of electrical connector 174 when the wheel assemblies 50 are supported on the drive unit spindle 30.

Note that the electrical connector 74 and electrical connector 174 of a wheel assembly 500, 502, 504, 506 may be independent electrical connectors. Alternatively, the electrical connector 74 and electrical connector 174 could be interconnected, such that a connection point on the electrical connector 74 is directly connected to a connection point on the electrical connector 174.

The electrical connector 34 on the drive unit spindle 30, the electrical connectors 74, 174 on the wheel assemblies 500, 502, 504 and 506 are connected in daisy-chain style when the wheel assemblies 500, 502, 504 and 506 are mounted on the drive unit spindle 30. For example, referring again to FIG. 3, when a first wheel assembly 506 is mounted on the drive unit spindle 30 with a second side 53 facing inward toward the vehicle, the electrical connector 74 of the first wheel assembly 506 will connect with the electrical connector 34 of the drive unit spindle 30.

Further, when a second wheel assembly 504 is mounted with the second side 53 facing inward toward the vehicle, after the first wheel assembly 506 has been mounted, the electrical connector 74 of the second wheel assembly 504 will connect with the electrical connector 174 of the first wheel assembly. Similarly, additional wheel assemblies 502, 500 could be mounted on the drive unit spindle 30 the electrical connectors 74, 174 connecting with the electrical connectors 74, 174 of adjacent wheel assemblies 504, 502. In this manner, electrical connections may be established between the drive unit spindle 30 and each of the wheel assemblies 500, 502, 504, 506, and each of the wheel assemblies 500, 502, 504, 506 may be electrically connected to each other.

According to the above, each of the wheel assemblies 500, 502, 504, 506 may independently receive commands from the vehicle 11. In this way, the motor 64 of the first wheel assembly 506 may be independently operated from the motor 64 of the second wheel assembly 504.

In addition, the battery 64 of the one wheel assembly 500 may be charged by the vehicle 11 through the connection between the electrical connector 34 of the drive unit spindle 30 and the electrical connector 74 of the one wheel assembly 500. When the wheel assembly 500 is mounted on the bicycle 100, the charge stored in the battery 64 may be used to provide power to the wheel assembly 500 to provide drive assist to the bicycle 100.

The electrical connector 174 and electrical connector 74 are only one example of mating electrical connectors that can be used to electrically connect adjacent wheel drive modules 50. Many other well-known types of electrical connectors may be used in order to provide electrical connectivity between the wheel assemblies 50 in a drive unit 20.

Figure 8:
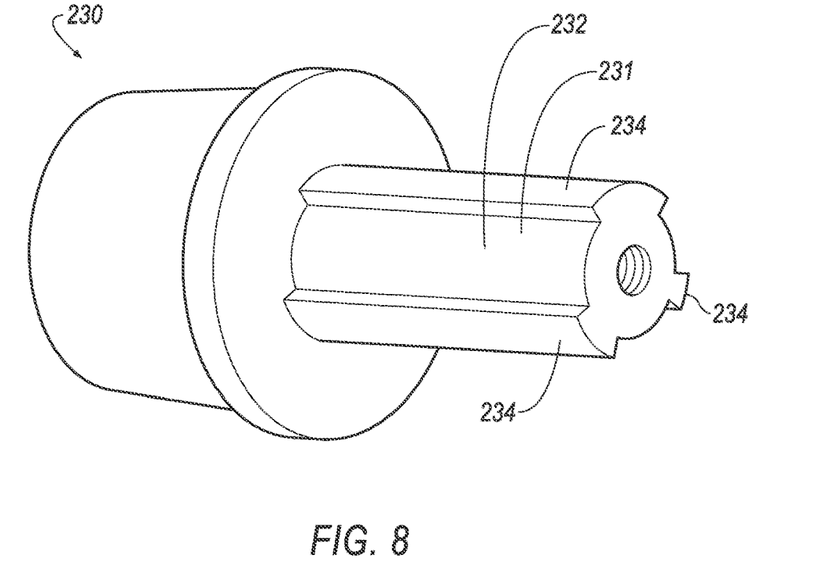
FIG. 8 is perspective view of another embodiment of the drive unit spindle with electrical connectors extending along an exterior surface of the drive unit spindle.
Figure 9:
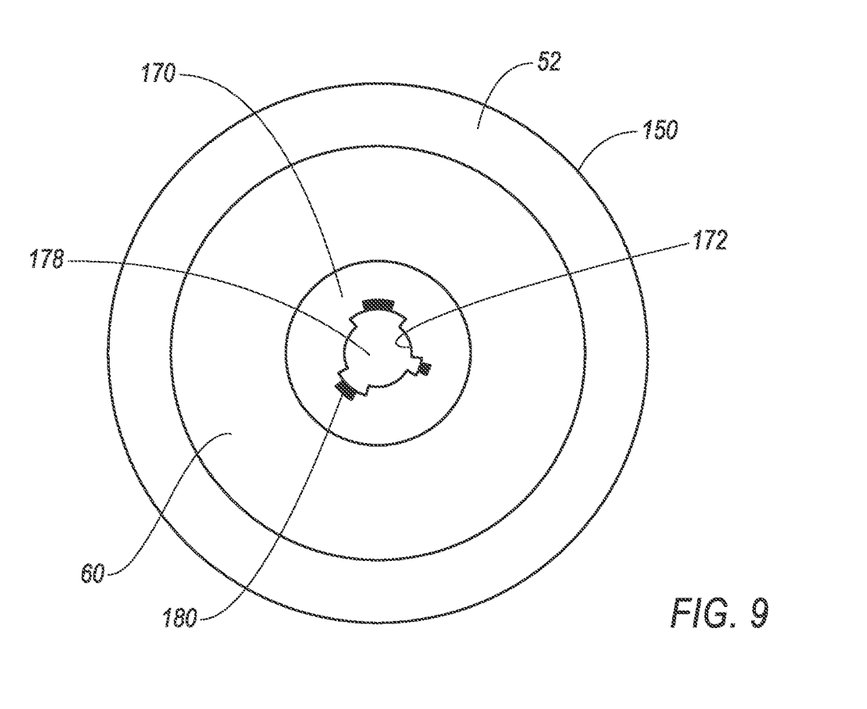
FIG. 9 is a plan view of another embodiment of a hub of the wheel assembly with electrical connectors on an interior surface for connecting with the drive unit spindle of FIG. 8.

Referring to FIGS. 8 and 9, for example, the drive unit spindle 230 may include an exterior surface 232 and an electrical connector 234 at the exterior surface 232, and the hub 170 of each wheel assembly 150 may include an interior surface defining an opening 172 receiving the drive unit spindle 230. The hub 170 of each wheel assembly 150 may include an electrical connector 180 at the interior surface 172 connected to the electrical connector 234 of the drive unit spindle 230.

In the example as shown in FIGS. 8 and 9, the wheel assembly 150 includes a hub 170, a wheel 52 that rotates about the hub 170, and a drive system 60 for driving the wheel 52 about the hub 170.

The hub 170 has an electrical connector 180 for forming an electrical connection between the wheel assembly 150 and the drive unit spindle 230. An inner surface 172 of the hub 170 forms an opening 178 for receiving the axle portion 231 of the drive unit spindle 230. The electrical connector 180 is located at the inner surface 172 of the hub 170.

The electrical connector 180 can be, for example, a plurality of metal contact points located at the inner surface 172 of the hub 170 such that when the wheel assembly 150 is mounted on the spindle 120, electrical connections are formed between the electrical connector 126 and the electrical connector 180.

Other forms of connectors, for example metal bumps formed on the spindle 120 and metal plates with indents for receiving the bumps on the inner surface 172 of the hub 170, can also be used.

Further, wireless communication may be used between the vehicle 11 and the wheel assemblies 500, 502, 504, 506, between one wheel assembly 500, 502, 504, 506 and another wheel assembly 500, 502, 504, 506, and between the bicycle 100 and the wheel assembly 500.

The wheel assemblies 500, 502, 504, 506 may be designed to have different performance features and also different axial widths. In this manner, different wheel assemblies 500, 502, 504, 506 may be chosen to optimize the performance of the drive unit 20 to particular operating conditions.

Referring again to FIGS. 3 and 4, the motor 64 of the one wheel assembly 506 may have a higher drive capability than the motor 64 of the second wheel assembly 504.

More generally, the wheel assemblies 500, 502, 504, 506 may have different drive capabilities. The drive capability will depend, at least in part, on the power rating of the motor 64.

For example, one wheel assembly 500 may include a 300 watt motor, and a second wheel module 50 may include a 600 watt motor resulting in a higher drive capability.

Different wheel assemblies 50 may also, for example, include batteries 66 with different storage capacity. In this manner, the drive units 20 can be adapted to different requirements (highway driving, local driving, towing a boat, extended range, etc.) by choosing the appropriate combination of wheel drive assemblies 50.

Further, the width of one wheel assembly 506 along the axis may be greater than the width of the second wheel assembly 504 along the axis. In order to accommodate different size motors or different size batteries, different versions of the wheel assemblies 50 may also be designed to have different axial widths. For example, the wheel assemblies 50 could be designed to have one axial width for a smaller motor and/or battery, or another larger axial width to accommodate a larger motor 64 and/or battery 66.

Each the drive unit 20 and the bicycle 100 may include locking caps 90, 190.

The exemplary drive unit 20 of FIG. 3 includes a locking cap 90. The drive unit spindle 30 has a proximal end 42 and a distal end 44. The wheel assemblies 500, 502, 504, 506 are supported between the proximal end 42 and the distal end 44. The locking cap 90 is connected to the drive unit spindle 30 on the distal end 44. The locking cap 90 has a stud 92 for attaching the locking cap 90 to the drive unit spindle 30. The stud 92 engages the attachment portion 40 of the distal end 44 of the axle portion 36 in order to attach the locking cap 90 onto the drive unit spindle 30.

For example, the engagement portion 40 and the stud 92 may be threaded to threadedly engage each other. Alternatively, the engagement portion 40, and the stud 92 may engage each other in any suitable manner. For example, the drive unit spindle 30 may include an engagement portion 40 which receives a stud 92 in a quick-release fashion.

Similarly, and referring to FIG. 5, the bicycle spindle 110 has a proximal end 119 for connecting to a frame 102 of the bicycle 100, and a distal end 121. The bicycle spindle 110 has an engagement portion 122 at the distal end 121.

The wheel assembly 500 is supported between the proximal end 119 and the distal end 121 of the bicycle spindle 110. A locking cap 190 may be attached to the distal end 121 of the bicycle spindle 110. As shown in FIG. 5, the locking cap 190 has a stud 192 for attaching the locking cap 190 to the bicycle spindle 110. The stud 192 engages the attachment portion 122 of the distal end 121 of the bicycle spindle 110 in order to attach the locking cap 190 onto the bicycle spindle 110.

The engagement portion 122 and the stud 192 may be threaded to threadedly engage each other. Alternatively, the engagement portion 122, and the stud 192 may engage each other in any suitable manner. For example, the drive unit spindle 30 may include an engagement portion 122 which receives a stud 192 in a quick-release fashion.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

The invention claimed is:

1. A drive unit for a vehicle, the drive unit comprising:
a drive unit spindle for connecting to the vehicle and extending along an axis;
a plurality of interconnectable wheel assemblies connected together on the drive unit spindle, a hub of each wheel assembly physically contacting an adjacent hub of an adjacent wheel assembly, and each of a first and second wheel assembly of the plurality of wheel assemblies including a wheel rotatable about the hub and a motor connected to the wheel for rotating the wheel about the hub; and
the hub and the motor of each of the first and second wheel assemblies being removably.

2. The drive unit of claim 1 wherein the first wheel assembly includes a control unit in communication with the motor.

3. The drive unit of claim 1 wherein the first wheel assembly includes a battery for supplying power to the motor.

4. The drive unit of claim 1 wherein the drive unit spindle includes an alignment feature and the hub of each wheel assembly defines an opening engaging the alignment feature for aligning the hub on the spindle.

5. The drive unit of claim 1 wherein the motor of the first wheel assembly has a higher wattage than the motor of the second wheel assembly.

6. The drive unit of claim 1 wherein a width of the first wheel assembly along the axis is greater than a width of the second wheel assembly along the axis.

7. The drive unit of claim 1, wherein the drive unit spindle includes an electrical connector and the hub of each of the plurality of wheel assemblies include an electrical connector connected to the electrical connector of the drive unit spindle.

8. The drive unit of claim 1, wherein the drive unit spindle has a proximal end for connecting to the vehicle and a distal end spaced away from the proximal end, the proximal end including an electrical connector, and the first wheel assembly including an electrical connector connected to the electrical connector of the proximal end of the drive unit spindle.

9. The drive unit of claim 8 wherein the second wheel assembly of the plurality of wheel assemblies includes an electrical connector connected to the electrical connector of the first wheel assembly.

10. The drive unit of claim 1 wherein:
the drive unit spindle includes an exterior surface and an electrical connector at the exterior surface, and
the hub of each wheel assembly includes an interior surface defining an opening receiving the drive unit spindle, the hub of each wheel assembly including an electrical connector at the interior surface connected to the electrical connector of the spindle.

11. The drive unit of claim 1, further comprising a locking cap, wherein:
the spindle has a proximal end and a distal end,
the wheel assemblies are supported between the proximal and distal ends, and
the locking cap is connected to the spindle on the distal end.

12. The drive unit of claim 7 wherein each of the plurality of wheel assemblies in the drive unit is programmed to receive commands from the vehicle.

13. The drive unit of claim 7, further comprising a locking cap, wherein:
the drive unit spindle has a proximal end and a distal end;
the wheel assemblies are supported between the proximal and distal ends; and
the locking cap is connected to the drive unit spindle on the distal end.

* * * * *